US010489992B2

(12) United States Patent
Weimerskirch

(10) Patent No.: US 10,489,992 B2
(45) Date of Patent: Nov. 26, 2019

(54) VEHICLE COMMUNICATION NETWORK

(71) Applicant: Lear Corporation, Southfield, MI (US)

(72) Inventor: Andre Weimerskirch, Ann Arbor, MI (US)

(73) Assignee: Lear Corporation, Southfield, MI (US)

(*) Notice: Subject to any disclaimer, the term of this patent is extended or adjusted under 35 U.S.C. 154(b) by 240 days.

(21) Appl. No.: 15/589,479

(22) Filed: May 8, 2017

(65) Prior Publication Data

US 2018/0322711 A1    Nov. 8, 2018

(51) Int. Cl.
| | |
|---|---|
| *G07C 5/00* | (2006.01) |
| *G06N 20/00* | (2019.01) |
| *B60W 20/50* | (2016.01) |
| *B60W 50/02* | (2012.01) |
| *G06N 5/04* | (2006.01) |
| *G07C 5/08* | (2006.01) |
| *H04L 29/06* | (2006.01) |

(52) U.S. Cl.
CPC .............. *G07C 5/008* (2013.01); *B60W 20/50* (2013.01); *B60W 50/02* (2013.01); *B60W 50/0205* (2013.01); *B60W 50/0225* (2013.01); *G06N 5/04* (2013.01); *G06N 20/00* (2019.01); *G07C 5/0808* (2013.01); *G07C 5/0816* (2013.01); *H04L 63/1466* (2013.01)

(58) Field of Classification Search
CPC .... G07C 5/008; G07C 5/0816; G07C 5/0808; B60W 50/0225; B60W 50/0205; B60W 50/02; B60W 20/50; G06N 5/04; G06N 20/00; H04L 63/1466
See application file for complete search history.

(56) References Cited

U.S. PATENT DOCUMENTS

| | | | |
|---|---|---|---|
| 6,212,473 B1 | 4/2001 | Stefan et al. | |
| 8,457,827 B1 | 6/2013 | Ferguson et al. | |
| 8,718,917 B2 | 5/2014 | Basnayake | |
| 10,176,524 B1 * | 1/2019 | Brandmaier et al. | .. G07C 5/008 |
| 10,185,999 B1 * | 1/2019 | Konrardy et al. | ..... G07C 5/008 |
| 2011/0238259 A1 | 9/2011 | Bai et al. | |
| 2014/0088855 A1 | 3/2014 | Ferguson | |
| 2014/0302774 A1 * | 10/2014 | Burke et al. | ........... G07O 5/008 455/3.05 |

(Continued)

FOREIGN PATENT DOCUMENTS

WO    WO2017/046805 A1 *  3/2017    ......... H04L 63/1408

OTHER PUBLICATIONS

CVTA Standards; Standards Integration Review Workshop-Security; Oct. 5, 2016, Ann Arbor, MI.

*Primary Examiner* — Dale W Hilgendorf
(74) *Attorney, Agent, or Firm* — Fishman Stewart PLLC

(57) ABSTRACT

In embodiments, a vehicle communication network may include a remote computer server, a vehicle including, a plurality of sensors, a wireless communication transceiver, and/or an electronic control unit (ECU) that may be configured to control operation of the vehicle and obtain information from the plurality of sensors. The ECU may be configured to analyze, via machine learning, the information from the plurality of sensors and to control the vehicle according to the analysis. The remote server may be configured to analyze, via machine learning, the information from the plurality of sensors and other vehicle information from sensors of other vehicles to detect an error.

18 Claims, 3 Drawing Sheets

(56) References Cited

U.S. PATENT DOCUMENTS

| | | |
|---|---|---|
| 2015/0020152 A1 | 1/2015 | Litichever et al. |
| 2015/0112504 A1* | 4/2015 | Binion et al. .......... G07C 5/008 |
| | | 701/1 |
| 2015/0172306 A1 | 6/2015 | Kim et al. |
| 2015/0178998 A1* | 6/2015 | Attard et al. .......... G07C 5/008 |
| | | 701/23 |
| 2015/0356794 A1 | 12/2015 | Prakah-Asante et al. |
| 2019/0036946 A1* | 1/2019 | Ruvio et al. ............ B60R 25/00 |

* cited by examiner

VEHICLE COMMUNICATION NETWORK

TECHNICAL FIELD

The present disclosure relates to communication networks, including vehicle communication networks.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

Vehicles often produce a large amount of data and may receive data from external sources. In some instances, it may be desirable to analyze and/or verify such data to detect problems, such as malfunctioning components and/or security breaches.

There is therefore a desire for solutions/options that minimize or eliminate one or more of the above-described challenges. The foregoing discussion is intended only to illustrate examples of the present field and should not be taken as a disavowal of scope.

SUMMARY

In embodiments, a vehicle communication network may include a remote computer server, a vehicle including, a plurality of sensors, a wireless communication transceiver, and/or an electronic control unit (ECU) that may be configured to control operation of the vehicle and obtain information from the plurality of sensors. The ECU may be configured to analyze, via machine learning, the information from the plurality of sensors and to control the vehicle according to the analysis. The remote server may be configured to analyze, via machine learning, the information from the plurality of sensors and other vehicle information from sensors of other vehicles to detect an error. The remote computer server may be configured to transmit an indication of the error to the ECU of the vehicle.

With embodiments, analyzing the information from the plurality of sensors may include creating a virtual environment of the vehicle. The virtual environment may include a model of the vehicle, a model of the ECU configured to emulate expected operation of the ECU, and/or models of other vehicles. The information from the plurality of sensors may include at least one of a vehicle speed and a vehicle location. The vehicle may be configured to receive other vehicle information from at least one other vehicle via dedicated short range communication (DSRC). The vehicle may be configured to transmit other vehicle information to the remote computer server via the wireless communication transceiver. The error may not include a violation of a static rule. Detecting the error may include identifying a discrepancy between previous information received from the ECU and current information received from the ECU. The discrepancy may relate to another vehicle.

In embodiments, the ECU may be configured to control the vehicle according to the indication from the remote computer server, and said control may include at least one of shifting to a safe mode and shutting down the vehicle. At least one of the ECU and the remote computer server may be configured to transmit the indication to an external receiver. The external receiver may be associated with at least one of a monitoring company, a manufacturer of the vehicle, a component supplier, and emergency services. At least one of the remote computer server and the ECU may be configured to determine a driver profile. The ECU may be configured to control the vehicle according to the driver profile and the analysis of the information from the plurality of sensors. The remote computer server may be configured to generate a prediction for the vehicle, to compare the prediction with the information from the plurality of sensors, and/or detect the error if the information from the plurality of sensors is not within a machine-learned range of the prediction.

In embodiments, a vehicle may include one or more sensors, a wireless communication transceiver, and/or an electronic control unit (ECU). A method of operating the vehicle may include receiving, at said ECU, first information about said vehicle from said one or more sensors, applying, via said ECU, at least one of machine learning and heuristics to the first information, detecting an error in the first information, and/or controlling, via said ECU, operation of said vehicle according to the error. Applying at least one of machine learning and heuristics includes generating a prediction. Detecting the error may include comparing the prediction with the first information. The method may include transmitting the first information to a remote computer server and applying, via the remote computer server, at least one of machine learning and heuristics to the first information. The method may include receiving, at a remote computer server, the first information. Detecting the error may include the remote computer server applying at least one of machine learning and heuristics to the first information.

With embodiments, the method may include receiving, at a remote computer server, second information from sensors of a second vehicle. Detecting the error may include the remote computer server applying at least one of machine learning and heuristics to the first information and the second information. The method may include receiving, at the remote computer server, third information from an external data source. Detecting the error may include the remote computer server applying at least one of machine learning and heuristics to the first information, the second information, and the third information. The remote computer server includes a model of the ECU configured to emulate expected operation of the ECU. The method may include transmitting, via the wireless communication transceiver, the information received from said one or more sensors. The error may be a result of hacking or attempted hacking.

DETAILED DESCRIPTION

Reference will now be made in detail to embodiments of the present disclosure, examples of which are described herein and illustrated in the accompanying drawings. While the disclosure will be described in conjunction with embodiments and/or examples, it will be understood that they are not intended to limit the present disclosure to these embodiments and/or examples. On the contrary, the present disclosure is intended to cover alternatives, modifications, and equivalents, which may be included within the spirit and scope of the present disclosure.

Figure 1:
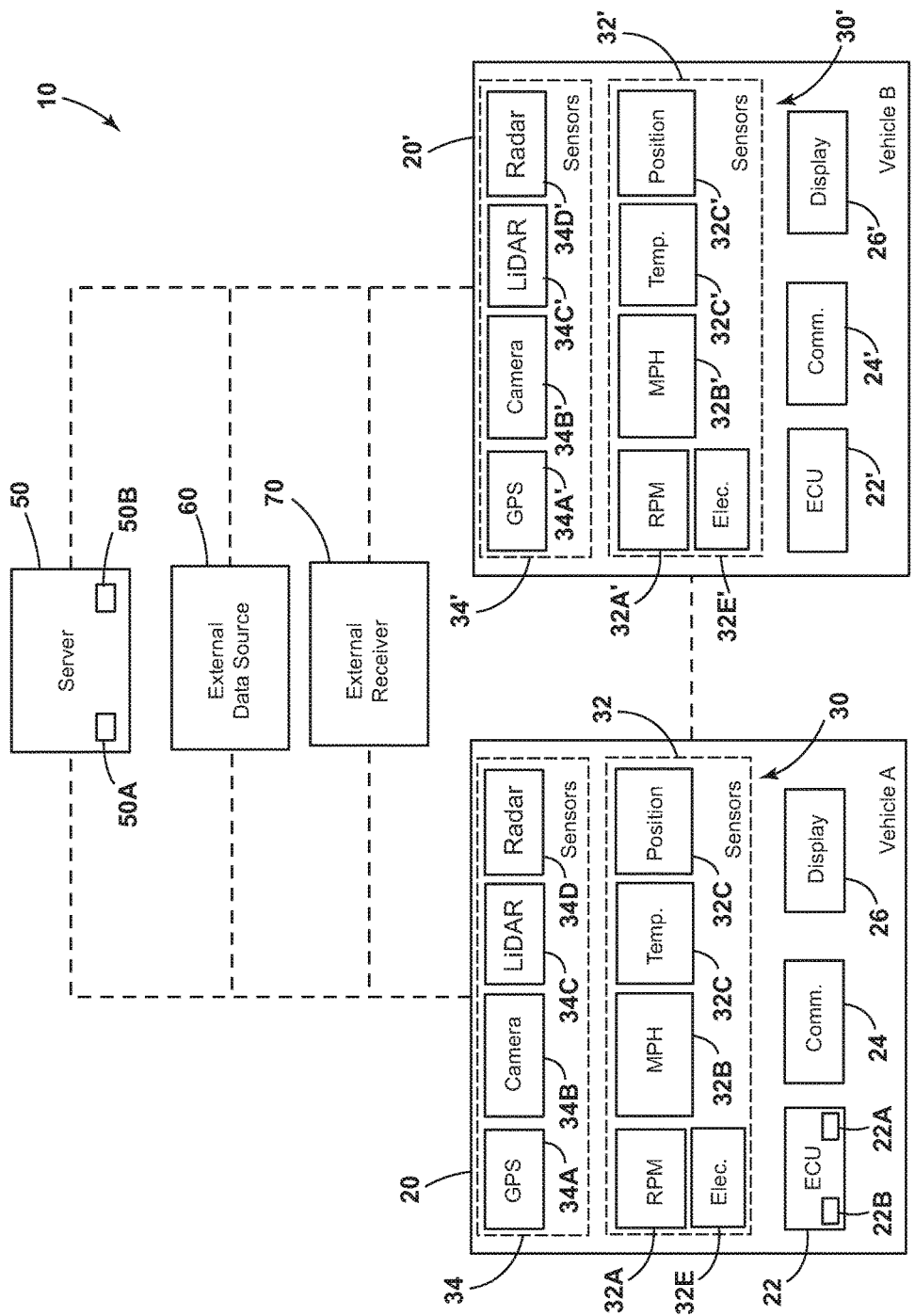
FIG. 1 is a schematic view of a vehicle communication network in accordance with an embodiment of the present disclosure.

As generally illustrated in FIG. 1, a vehicle communication network may include one or more vehicles 20, 20', a remote computer server 50, one or more external data sources 60, and/or one or more external receivers 70. A vehicle 20 may include an electronic control unit (ECU) 22, a communication device 24, a display 26, and/or one or more sensors 30. Other vehicles, such as second vehicle 20', may include an ECU 22', a communication device 24', a display 26', and/or one or more sensors 30'.

In embodiments, an ECU 22 may include an electronic controller and/or include an electronic processor 22A, such as a programmable microprocessor and/or microcontroller. In embodiments, ECU 22 may include, for example, an application specific integrated circuit (ASIC). ECU 22 may include a central processing unit (CPU), a memory 22B, and/or an input/output (I/O) interface. ECU 22 may be configured to perform various functions, including those described in greater detail herein, with appropriate programming instructions and/or code embodied in software, hardware, and/or other medium. In embodiments, ECU 22 may include a plurality of controllers. In embodiments, ECU 22 may be connected to a display 26.

With embodiments, communication device 24 may be configured to communicate via wired and/or wireless connections. For example, and without limitation, communication device 24 may be configured to communicate via WiFi, cellular networks, local area networks (LAN), wireless local area networks (WLAN), wide area networks (WAN), controller area networks (CAN), dedicated short range communication (DSRC), personal area networks (PAN) Bluetooth®, radio networks, and/or other types of communication. Communication device 24 may include, for example, a wireless communication transceiver.

In embodiments, a sensor 30 may be configured to sense (e.g., measure, monitor, etc.) information about a vehicle and/or information about an environment of a vehicle 20. Information may include, for example, one or more of data, values, and/or other information that may relate to one or more vehicle parameters, such as, for example, vehicle speed, acceleration, location, engine speed, tire pressure, steering wheel position, pedal positions, transmission gear, temperatures, and expected braking distance, among many others.

A vehicle 20 may include a first set of sensors 32 and/or a second set of sensors 34, in embodiments. A first set of sensors 32 may be configured to sense information about vehicle 20. For example, and without limitation, first set of sensors 32 may include one or more of an engine speed sensor 32A, a vehicle speed sensor 32B, a temperature sensor 32C, a position sensor 32D (e.g., steering wheel, pedals, gear shifter, etc.), and/or an electrical characteristic sensor 32E (e.g., current, voltage, resistance, etc.). Second vehicle sensors 30' may include, for example, a first set of sensors 32', which may include one or more an engine speed sensor 32A', a vehicle speed sensor 32B', a temperature sensor 32C', a position sensor 32D', and/or an electrical characteristic sensor 32E'.

In embodiments, a second set of sensors 34 may be configured to sense information about the environment of the vehicle 20. For example and without limitation, the second set of sensors 34 may include one or more of a location/global positioning system (GPS) device 34A, a camera 34B, a light detection and ranging (LiDAR) device 34C, and/or a radio detection and ranging (radar) device 34D. Second vehicle sensors 30' may include a second set of sensors 34', which may include, for example, one or more of a location/GPS device 34A', a camera 34B', a LiDAR device 34C', and/or a radar device 34D'.

In embodiments, a remote server 50 may include an electronic controller and/or include an electronic processor 50A, such as a programmable microprocessor and/or microcontroller. In embodiments, ECU 22 may include, for example, an application specific integrated circuit (ASIC). ECU 22 may include a central processing unit (CPU), memory 50B, and/or an input/output (I/O) interface. ECU 22 may be configured to perform various functions, including those described in greater detail herein, with appropriate programming instructions and/or code embodied in software, hardware, and/or other medium. In embodiments, remote server 50 may include a plurality of controllers. Remote server 50 may include a remote computer server. Remote server 50 may be disposed at a location or locations remote from vehicle 20, vehicle 20', external data source 60, and/or external receiver 70.

With embodiments, ECU 22 may obtain/receive information about a vehicle 20 and/or an environment of a vehicle 20 via sensors 30 and/or via communication device 24. ECU 22 may be configured to control, at least in part, operation of vehicle 20 according to the obtained information. Accordingly, it may be desirable to monitor the obtained information for discrepancies (e.g., errors and/or security breaches) to prevent ECU 22 from controlling vehicle 20 according to errant or incorrect information. ECU 22 may be configured to process a large amount of received information and may or may not be configured to analyze/monitor received information for discrepancies. ECU 22 may be connected to communication device 24, which may be configured to provide some or all of the information received by ECU 22 to a remote server 50.

In embodiments, ECU 22 and/or remote server 50 may be configured to analyze information received from or about a vehicle 20 and/or one or more external data sources 60 to detect errors. With some designs, analysis of vehicle information may be conducted according to a plurality of static rules. For example, if a certain parameter is outside a set or predetermined range, a discrepancy may be detected. However, relying on static rules may be difficult for large quantities of information and/or a large number of data sources, as each parameter and/or data source may require its own set of static rules. Generating such a vast set of static rules may not be feasible and/or may increase a risk of not considering a potential use scenario and not including a corresponding rule for that use scenario. For example, and without limitation, generating such rules may involve understanding and compensating for every possible use case, which may not be feasible/practical.

With embodiments of the present disclosure, ECU 22 and/or remote server 50 may be configured to analyze vehicle information according to machine learning and/or heuristics. Machine learning may include, for example, one or more of obtaining information over a period of time, determining patterns of such information during normal use, a logistic regression classifier, support vector machines, Bayesian principles (e.g., statistics, networks, knowledge bases, etc.), supervised learning, unsupervised learning, neural networks, decision trees, Markov models, Haar classifiers, data clustering, and/or other techniques or algorithms.

Machine learning may permit ECU 22 and/or remote server 50 to analyze vast amounts of information without specific rules for every use case, type of information, and/or parameter. With embodiments, ECU 22 and/or remote server 50 may be provided with one or more initial sets of information that have been determined to be valid and the initial set(s) of information may be used in an initial learning phase.

With embodiments, remote server 50 and/or ECU 22 may be configured to analyze, via machine learning and/or heuristics, some or all information relating to a vehicle 20. For example, and without limitation, remote server 50 and/or ECU 22 may be configured to analyze information about a vehicle 20 (e.g., via a first set of sensors 32) and/or about an environment of vehicle 20 (e.g., via a second set of sensors 34, other vehicles 20', external sources 60, etc.). Remote server 50 may, for example, receive information via ECU 22, via first set of sensors 32, via second set of sensors 34, and/or via one or more external data sources 60. In embodiments, ECU 22 may be configured to analyze information via machine learning and/or heuristics independently from remote server 50. With embodiments, ECU 22 and/or remote server 50 may be configured to determine acceptable/normal ranges for various parameters via machine learning and/or heuristics (e.g., determine machine-learned ranges). Machine-learned ranges may be dynamic and/or change of over time.

ECU 22 and/or remote server 50 may receive information directly from first set of sensors 32 and/or second set of sensors 34 (e.g., via communication device 24). ECU 22 and/or remote server 50 may be configured to determine if the information provided by sensors 30 is reasonable/correct. For example, and without limitation, ECU 22 and/or remote server 50 may analyze, via machine learning, information received from first set of sensors 32 and/or second set of sensors 34. If the information received from the sensors 30 is not within certain ranges of typical or expected information (e.g., as determined via machine learning) or is not consistent with other sources (e.g., another vehicle 20' or an external data source 60), ECU 22 and/or remote server 50 may detect a discrepancy/error with the sensor. For example, and without limitation, if a vehicle position sensor 34A (e.g., a GPS sensor) senses that vehicle 20 is disposed at a first position that is significantly different (e.g., by 1 foot, 10 feet, 100 feet, etc.) from a position sensed by another vehicle 20' (e.g., via radar/LiDAR) and/or a position determined via an external data source 60 (e.g., a cellular network to which vehicle 20 and/or a device, such as a cellular phone, in vehicle 20 is connected), ECU 22 and/or remote server 50 may determine that vehicle location sensor 34A is malfunctioning, needs to be recalibrated, and/or has been hacked (e.g., has been accessed or modified by an unauthorized device and/or entity). With embodiments, ECU 22 and/or remote server 50 may determine, via machine learning, that at least a small difference between information received from a sensor 30 and information received from one or more other sources is to be expected (or is within a probability range) and may be configured to determine when such a difference is the result of an error.

In embodiments, ECU 22 and/or remote server 50 may be configured to at least temporarily recalibrate a sensor according to data from other sources (e.g., another vehicle 20' and/or an external data source 60) if the sensor 30 is determined to be malfunctioning. For example, and without limitation, if a GPS sensor 34A consistently indicates a position that is 10 feet different from an actual position (e.g., determined via other information sources), remote server 50 may recalibrate GPS sensor 34A (e.g., via ECU 22), ECU 22 may recalibrate the GPS sensor, and/or ECU 22 may compensate for the 10 foot discrepancy (e.g., until GPS sensor 34A can be serviced/replaced).

Remote server 50 may receive information directly from first set of sensors 32 and/or second set of sensors 34 (via communication device 24) and from ECU 22, in embodiments. Remote server 50 may be configured to determine if the information relayed/transmitted from ECU 22 to remote server 50 is different from the information received directly from sensors 30, such as first set of sensors 32 and/or second set of sensors 34. If the information received from sensors 30 is different from the information received from ECU 22, remote server 50 may detect a discrepancy/error. The error may include ECU 22 malfunctioning, ECU 22 incorrectly processing information, and/or a communication error between sensors 30 and ECU 22.

With embodiments, remote server 50 may include a model of ECU 22 that may be configured to emulate ECU 22. Remote server 50 may use the model in detecting discrepancies/errors. For example, and without limitation, remote server 50 may learn a normal difference, if any, between the behavior of ECU 22 and the model of the ECU 22, and may detect an error if a sensed difference is outside a range of normal differences.

In embodiments, remote server 50 may be configured to receive information (e.g., commands) transmitted by ECU 22 to components/systems of a vehicle 20. For example, and without limitation, commands sent by ECU 22 to vehicle systems may also be sent/copied to remote server 50, such as via communication device 24. Remote server 50 may be configured to determine, via machine learning, if information transmitted by ECU 22 to vehicle components/systems includes an error and/or was transmitted in error. For example, and without limitation, remote server 50 may learn, via machine learning, what commands ECU 22 should be sending to vehicle components/systems for a given set of input information (e.g., from sensors 30). If the commands sent by ECU are incorrect, abnormal, and/or do not match what the model of ECU 22 would send, remote server 50 may be configured to indicate an error to an occupant of vehicle 20, cause the vehicle 20 to transition to a safe mode, cause vehicle 20 to shut down, and/or communicate with an external receiver 70 (e.g., a monitoring company, vehicle manufacturer, component supplier, emergency services, etc.).

With embodiments, ECU 22 may be configured to broadcast information about vehicle 20, such as via DSRC. The broadcast information may be received by another vehicle 20' and/or some other receiver 70 (e.g., a fixed receiver disposed near a road). The broadcast information may be used by one or more other vehicles (e.g., vehicle 20') for controlling the other vehicle(s) 20' and/or by another receiver 70 for controlling other vehicles. Remote server 50 may be configured to receive the information broadcast by first vehicle 20 and determine, via machine learning, whether the broadcast information includes an error and/or was transmitted in error. For example, and without limitation, if first vehicle 20 broadcasts that it is moving at a first speed and suddenly starts broadcasting that it is moving at a second speed that is much faster or slower than the first speed, remote server 50 may detect that an error has occurred (e.g., via machine learning, remote server 50 may determine that the sudden change in broadcasted speed is not normal, such as if first vehicle 20, or any similar vehicle, has never accelerated or decelerated at that rate before or is not capable of such a change). If the information broadcast by ECU 22 is incorrect, remote server 50 may be configured to indicate an error to an occupant of vehicle 20 (e.g., via display 26), prevent ECU 22 from broadcasting, cause ECU 22 to broadcast an error message, cause vehicle 20 to transition to a safe mode, cause vehicle 20 to shut down, and/or communicate with an external receiver 70 (e.g., a monitoring company, vehicle manufacturer, component supplier, emergency services, etc.).

In embodiments, ECU 22 and/or remote server 50 may be configured to analyze, via machine learning, information broadcast by other vehicles (e.g., second vehicle 20'). For example, and without limitation, other vehicles (e.g., vehicle 20') may broadcast information via DSRC and remote server 50 may be configured to receive such information, such as via ECU 22, communication device 24, and/or a separate transceiver (e.g., a roadside transceiver). Analyzing information from second vehicle 20' via machine learning may include comparing the information with previous information obtained from second vehicle 20', information received at/from first vehicle 20 about second vehicle 20', and/or information received from an external source 60 about second vehicle 20. If the information broadcast by second vehicle 20' is incorrect, ECU 22 and/or remote server 50 may be configured to indicate an error to an occupant of the first vehicle 20 (e.g., via display 26), indicate an error to an occupant of second vehicle 20' (e.g., via display 26'), cause ECU 22 of first vehicle 20 to ignore at least the incorrect information received from second vehicle 20', cause second vehicle 20' to broadcast an error message, cause second vehicle 20' to transition to a safe mode, cause second vehicle 20' to shut down, and/or communicate with an external receiver 70 (e.g., a monitoring company, vehicle manufacturer, component supplier, emergency services, etc.).

ECU 22 and/or remote server 50, in embodiments, may be configured to verify information received from an external data source 60. An external data source 60 may include, among other things, roadside devices (e.g., sensors, transceivers, etc.), cellular networks (e.g., for determining/triangulating position), and/or another remote server. ECU 22 and/or remote server 50 may learn, via machine learning, what information is typically received from external sources 60 and/or be configured to detect an error (e.g., an anomaly, discrepancy, inconsistency, malfunction, security breach, etc.) in information received from external sources 60. If an error is detected, remote server 50 may not provide the external information to vehicles 20, 20' or may provide an indication to the vehicle(s) 20, 20' that the information appears to be in error, which may allow the vehicle(s) 20, 20' to ignore at least the incorrect portions of the information and/or provide less weight to such information in determining how to control the vehicle(s) 20, 20'.

With embodiments, ECU 22 and/or remote server 50 may be configured to create a virtual environment that may emulate a vehicle 20 and/or the environment of vehicle 20. Remote server 50 may be configured to analyze information, via machine learning, according to the virtual environment. The virtual environment may include models of, among other things, vehicle 20 (e.g., including ECU 22, communication device 24, sensors 30, etc.), one or more other vehicles, pedestrians, structures, animals, roads, and/or road signs, among other things. ECU 22 and/or remote server 50 may be configured to create the virtual environment according to information received from a first set of sensors 32 of vehicle 20, a second set of sensors 34 of the vehicle 20, another vehicle 20', and/or one or more external data sources 60. Over time, ECU 22 and/or remote server 50 may be configured to determine, via machine learning, whether information regarding a vehicle 20 or its environment is correct or is an error that may be the result of a malfunction or a security breach/hacking.

With embodiments, remote server 50 and/or ECU 22 may be configured to predict future information about a vehicle 20 via machine learning. For example, and without limitation, remote server 50 and/or ECU 22 may be configured to predict a speed or ranges of speeds, or a location or ranges of locations of vehicle 20 for a future time. The prediction may be determined via historical information about vehicle 20, current information about vehicle 20 (e.g., from sensors 30), and/or the environment of vehicle 20 (e.g., from other vehicles 20', external data sources 60, etc.).

With embodiments, remote server 50 and/or ECU 22 may compare predictions for a vehicle 20 to actual (e.g., sensed) information received from vehicle 20 and/or sensors 30. If the prediction (or a series of predictions) is significantly different than the actual information received from the vehicle 20/sensors 30, ECU 22 and/or remote server 50 may detect a malfunction or hacking. Thus, remote server 50 and/or ECU 22 may not only analyze current information being received from a vehicle 20 relative to historical information about the vehicle 20, but may, additionally or alternatively, generate predictions for the vehicle 20 and compare information being received from the vehicle 20 with those predictions.

Remote server 50 and/or ECU 22, in embodiments, may be configured to learn, via machine learning, information about a plurality of vehicles 20, 20' and/or about vehicle environments over a period of time. The machine-learned information may be used for predicting future behavior/information of other vehicles 20'. For example, and without limitation, remote server 50 may obtain or store information about where/when vehicles typically slow down (e.g., sharp curves, high traffic areas/times, etc.) and may use that information in predicting future information about a particular vehicle 20 (e.g., if a vehicle 20 is approaching an area known to have increased traffic, remote server 50 may factor an increased likelihood of a slow down into its prediction of a future speed of vehicle 20). Additionally or alternatively, remote server 50 and/or ECU 22 may be configured to determine and/or obtain live traffic information and may include such live traffic information into predictions.

With embodiments, remote server 50 and/or ECU 22 may be configured to determine and/or receive information about traffic signals that a vehicle 20 is expected to encounter. For example, remote server 50 and/or ECU 22 may be configured to receive information about when a traffic signal will change from red to green (or from green to yellow to red), and/or may be configured to predict when a traffic signal will change based on historical information (e.g., the amount of time vehicles are usually stopped at a traffic signal at a certain time of day) and/or based on how long vehicles have been stopped at a traffic signal or have been driving through a traffic signal.

Remote server 50 and/or ECU 22, in embodiments, may be configured to learn, via machine learning, information about drivers/occupants of vehicles and may be configured to create and store a driving profile for a driver. For example, and without limitation, remote server 50 and/or ECU 22 may learn driving tendencies, such as, speeds relative to speed limits, acceleration profiles (e.g., how fast the driver typically accelerates from a stop and/or to pass another vehicle), braking profiles (e.g., how quickly the driver responds to a need to brake, how hard the driver usually brakes), turning profiles (e.g., typical G-forces experienced), and/or typical distances from other vehicles (e.g., tailgating tendencies, passing distances). Remote server 50 and/or ECU 22 may be configured to continuously update the driver profile as additional information is received (e.g., as the driver drives).

Remote server 50 and/or ECU 22 may use information from a driver profile in detecting errors in information received about a vehicle driven by the driver (e.g., information from sensors 30, from another vehicle 20', from an external source 60, etc.). For example, and without limitation, if a first driver tends to accelerate relatively quickly from a stop, remote server 50 may consider receiving information that a vehicle driven by the first driver has accelerated quickly to be normal. On the other hand, if a second driver tends to accelerate slowly from a stop, remote server 50 may consider receiving information that a vehicle driven by a second driver has accelerated quickly to potentially be the result of an error.

A remote server 50 and/or ECU 22 using machine learning may be configured to detect misbehavior and/or threats to a vehicle 20, 20' or a vehicle network 10, with embodiments. For example, and without limitation, remote server 50 and/or ECU 22 may be configured to analyze information from a first vehicle 20, one or more other vehicles 20', and/or external sources 60. Remote server 50 and/or ECU 22 may not be initially programmed with relatively few, if any, static rules or information for detecting a malfunction or hacking. Remote server 50 and/or ECU 22 may learn, via machine learning, what normal operating conditions involve (e.g., what information is typically generated during normal operating conditions), which may allow remote server 50 and/or ECU 22 to detect if information being received and/or transmitted is not normal, such as due to malfunction or hacking. Remote server 50 and/or ECU 22 may be configured to ignore and/or compensate for anomalous information (e.g., a temporary sensor malfunction) and/or may be configured to distinguish between a temporary malfunction and hacking.

Figure 2:
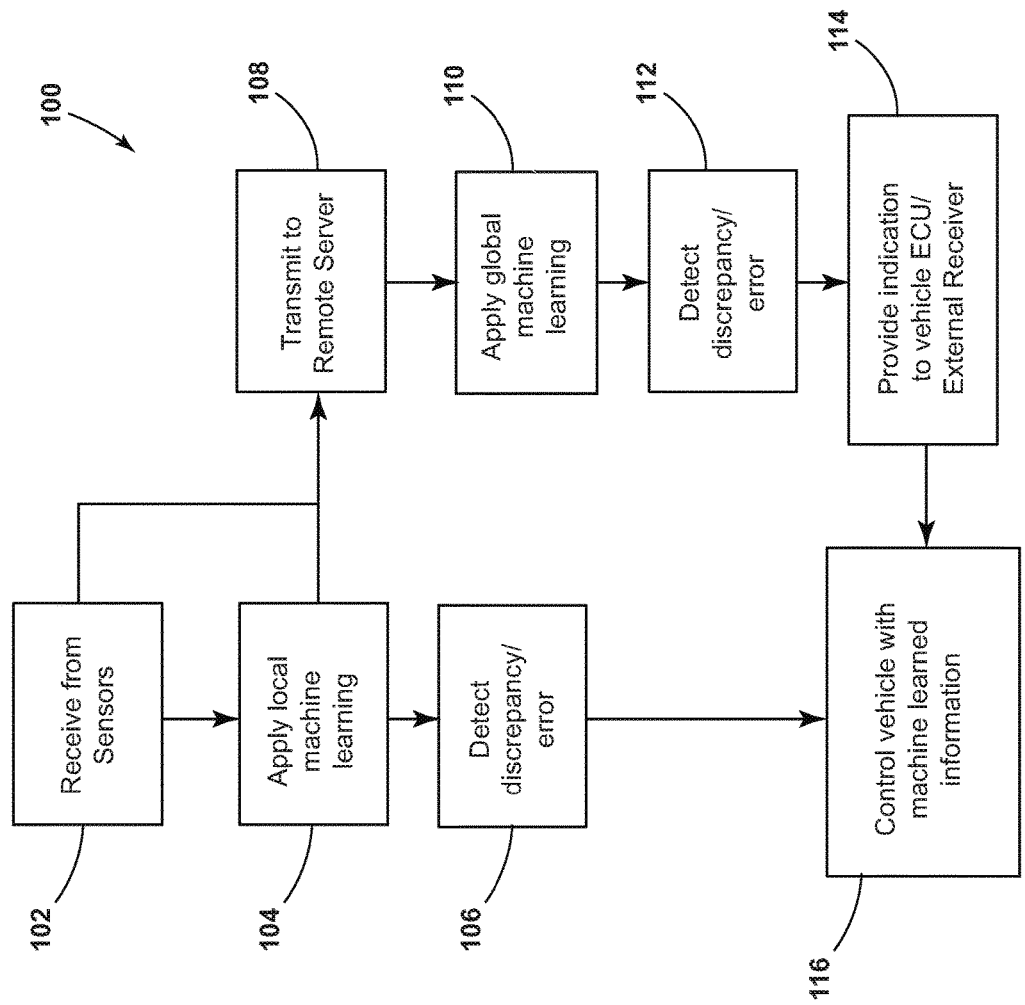
FIG. 2 is a flow diagram of a method of controlling a vehicle via a vehicle communication network.

In embodiments, such as generally illustrated in FIG. 2, a method 100 of operating a vehicle may include an ECU 22 of a vehicle 20 receiving information from sensors 30, such as a first set of sensors 32 and/or a second set of sensors 34, in step 102. In step 104, ECU 22 may analyze information received from the sensors 30 by applying machine learning and/or heuristics, and, in step 106, may detect a discrepancy or error if the information from sensors 30 is not within machine-learned ranges. In step 108, information from sensors 30 and/or from ECU 22 (e.g., results from machine learning analysis) may be transmitted to a remote server 50, such as via ECU 22 and/or communication device 24. In step 110, remote server may analyze the information from sensors 30 by apply machine learning and/or heuristics. In step 112, remote server 50 may detect a discrepancy or error and, in step 114, may communicate results of the remote server analysis and/or error detection to ECU 22 and/or an external receiver 70. In step 116, ECU 22 may control vehicle 20 according to (i) the ECU analysis of the information from sensors 30, (ii) according to the ECU detection of a discrepancy or error, (iii) the remote server analysis of the information from sensors 30, and/or (iv) according to the remote server detection of a discrepancy or error.

Machine learning and/or heuristics used by remote server 50 may be different from the machine learning and/or heuristics applied by ECU 22, in embodiments. For example, and without limitation, remote server 50 may receive a greater amount of information from a greater number of information sources (e.g., other vehicles, infrastructure, etc.) and may be configured to identify larger-scale/more widely-spread issues/errors than ECU 22.

Figure 3:
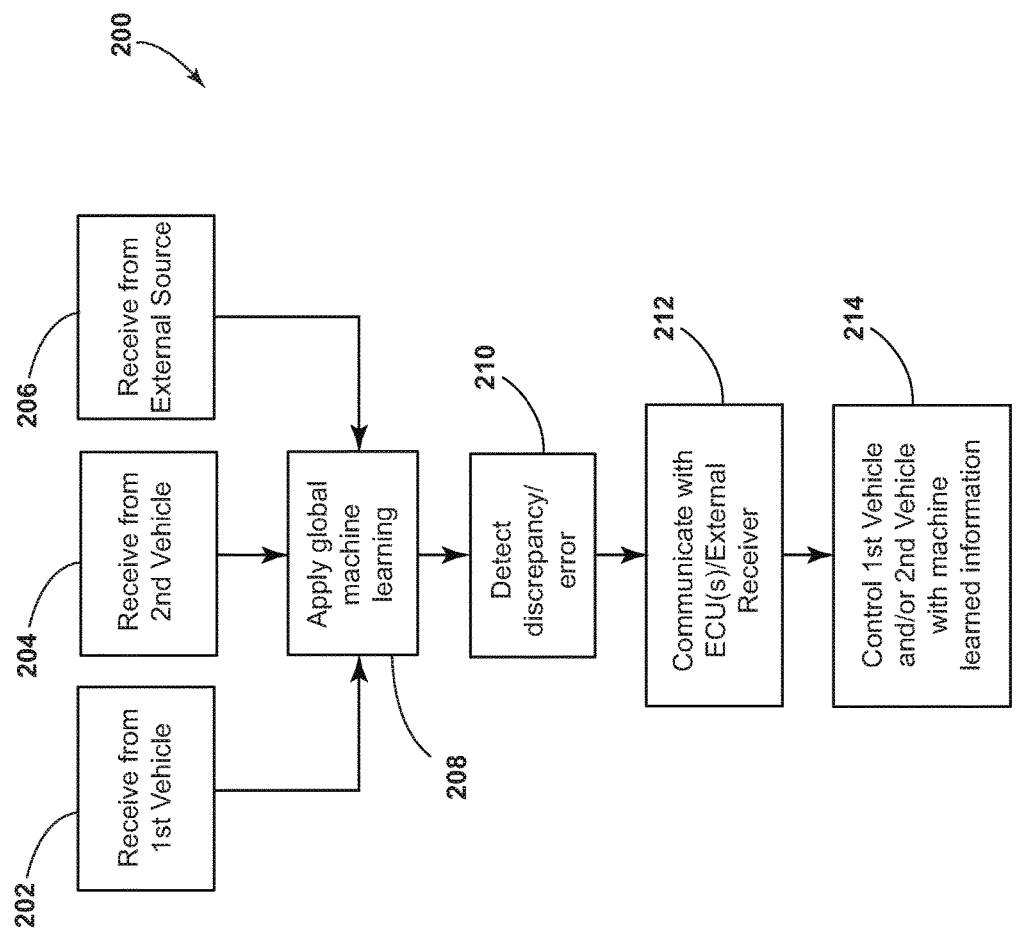
FIG. 3 is a flow diagram of a method of controlling a vehicle via a vehicle communication network.

With embodiments, such as generally illustrated in FIG. 3, a method 200 of operating vehicles (e.g., vehicles 20, 20') may include remote server 50 receiving information from a first vehicle 20 (step 202), information from a second vehicle (step 204), and/or information from one or more external sources (step 206). Information from first vehicle 20 may include information about first vehicle 20, second vehicle 20', an environment of first vehicle 20, and/or an environment of second vehicle 20'. Information from second vehicle 20' may include information about second vehicle 20', first vehicle 20, an environment of second vehicle 20', and/or an environment of first vehicle 20. Information from external source 60 may include information about vehicles 20, 20' (or other vehicle) and/or their environments. In step 208, remote server 50 may analyze the received information by applying machine learning and/or heuristics. In step 210, remote server may detect a discrepancy or error in the received information according to the machine learning/heuristic analysis. In step 212, remote server may communicate with first vehicle ECU 22, second vehicle ECU 22', and/or an external receiver 70. The communication may include results of the analysis and/or an indication of a detected error/discrepancy. In step 214, ECU 22 of first vehicle 20 may control first vehicle 20 according to the communication from remote server 50, and/or ECU 22' of second vehicle 20' may control second vehicle 20' according to the communication from remote server 50.

Methods (e.g., methods 100, 200) may be described here in connection with various method steps, but it should be understood that embodiments of the present disclosure do not necessarily require all described steps and steps of various methods may be combined.

With embodiments, an ECU (e.g., ECU 22) may be connected to and/or include an electronic processor 22A and/or a memory 22B (e.g., a non-transitory computer-readable medium). A computer program (e.g., code, logic, instructions, etc.) may be encoded and/or stored on memory 22B. Processor 22A may be configured to execute the computer program. When executed by processor 22A, the computer program may be configured to carry out one or more of the functions, methods, and/or steps described herein. For example, and without limitation, the computer program may be configured to cause ECU 22 of vehicle 20 to (a) receive first information about said vehicle 20 from one or more sensors 30, (b) apply at least one of machine learning and heuristics to the first information, (c) detect an error in the first information, and/or (d) control operation of said vehicle 20 according to the error.

While various functions or features are described in connection with embodiments of ECU 22 or remote server 50, ECU 22 and remote server 50 may include some or all of such functions and/or features. While various functions or features may be described in connection a first vehicle 20 and/or ECU 22, other vehicles, such as a second vehicle 20' (and ECU 22'), may include some or all of the described functionality or features.

It should be understood that a system/network 10, an electronic control unit (ECU) 22, a remote server 50, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM (read-only memory), RAM (random access memory), a combination of non-volatile and volatile (modifiable)

memory so that any software may be stored and yet allow storage and processing of dynamically produced data and/or signals.

It should be further understood that an article of manufacture, which may include an ECU (e.g., ECU 22) and/or remote server 50, in accordance with this disclosure may include a non-transitory computer-readable storage medium (e.g., memory 22B) having a computer program encoded thereon for implementing logic and other functionality described herein. The computer program may include code to perform one or more of the methods disclosed herein. Such embodiments may be configured to execute one or more processors (e.g., processor 22A), multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification, but that the scope of the present disclosure will include any embodiments falling within the foregoing description and the appended claims.

What is claimed is:

1. A vehicle communication network, comprising:
a remote computer server; and
a vehicle including:
  a plurality of sensors;
  a wireless communication transceiver; and
  an electronic control unit (ECU) configured to control operation of the vehicle and obtain information from the plurality of sensors;
wherein the ECU is configured to analyze, via machine learning, the information from the plurality of sensors and to control the vehicle according to the analysis; the ECU is configured to receive second vehicle information obtained via sensors of a second vehicle; the remote computer server is configured to analyze, via machine learning, the information from the plurality of sensors and second vehicle information from sensors of the second vehicle to detect an error; the remote computer server is configured to transmit an indication of the error to the ECU of the vehicle and the second vehicle; the vehicle is configured to receive said second vehicle information via dedicated short range communication (DSRC); the vehicle is configured to transmit said second vehicle information to the remote computer server via the wireless communication transceiver; and the remote computer server is configured to prevent the second vehicle from broadcasting the second vehicle information.

2. The vehicle communication network of claim 1, wherein analyzing the information from the plurality of sensors includes creating a virtual environment of the vehicle, the virtual environment including a model of the vehicle, a model of the ECU configured to emulate expected operation of the ECU, and a model of said second vehicle.

3. The vehicle communication network of claim 1, wherein the information from the plurality of sensors includes at least one of a vehicle speed and a vehicle location.

4. The vehicle communication network of claim 1, wherein if the remote computer server determines that the second vehicle information is incorrect, the remote computer server is configured to communicate with an external receiver.

5. The vehicle communication network of claim 1, wherein the error does not include a violation of a static rule.

6. The vehicle communication network of claim 5, wherein detecting the error includes the remote computer server identifying a discrepancy between previous information received from the ECU and current information received from the ECU.

7. The vehicle communication network of claim 6, wherein the discrepancy relates to the second vehicle.

8. The vehicle communication network of claim 1, wherein the ECU is configured to control the vehicle according to the indication from the remote computer server, and said control includes at least one of shifting to a safe mode and shutting down the vehicle.

9. The vehicle communication network of claim 1, wherein the ECU is configured to transmit the indication of the error to a display of said second vehicle.

10. The vehicle communication network of claim 1, wherein if the remote computer server detects the error in said second vehicle information, the remote computer server is configured to transmit the indication of the error to the second vehicle.

11. The vehicle communication network of claim 1, wherein if the remote computer server determines that the second vehicle information is incorrect, the remote computer server is configured to cause the second vehicle to shift to a safe mode.

12. A method of operating a vehicle having one or more sensors, a wireless communication transceiver, and an electronic control unit (ECU), the method comprising:
receiving, at said ECU, first information about said vehicle from said one or more sensors;
receiving, at said ECU, second information from sensors of a second vehicle;
applying, via said ECU, at least one of machine learning and heuristics to the first information and the second information;
detecting an error in the second information;
controlling, via said ECU, operation of said vehicle according to the first information and ignoring the second information;
receiving, at a remote computer server, the second information;
transmitting, via the remote computer server, an indication of the error to said vehicle and said second vehicle; and
preventing, via the remote computer server, the second vehicle from broadcasting the second information.

13. The method of claim 12, wherein applying at least one of machine learning and heuristics includes generating a prediction, and detecting the error includes comparing the prediction with the second information.

14. The method of claim 12, comprising transmitting the first information and the second information to the remote computer server and applying, via the remote computer server, at least one of machine learning and heuristics to the first information and the second information.

15. The method of claim 14, wherein the remote computer server includes a model of the ECU configured to emulate expected operation of the ECU.

16. The method of claim 14, wherein the remote computer server is configured to apply heuristics and/or machine learning differently than the ECU.

17. The method of claim 12, comprising receiving, at the remote computer server, the first information; receiving, at the remote computer server, the second information; wherein detecting the error includes the remote computer server applying at least one of machine learning and heuristics to the first information and the second information; wherein the second information includes information about the vehicle and information about the second vehicle.

18. The method of claim 12, comprising receiving, at the remote computer server, third information from an external data source; wherein detecting the error includes the remote computer server applying at least one of machine learning and heuristics to the first information, the second information, and the third information; and the external data source includes a roadside device.

* * * * *